United States Patent [19]

Nomura et al.

[11] Patent Number: 4,777,539

[45] Date of Patent: Oct. 11, 1988

[54] PROCESS OF RECORDING TIME CODES ONTO A VIDEO DISK INCLUDING PERIODIC ADJUSTMENT OF TIME CODES

[75] Inventors: Satoru Nomura; Yoshihisa Nagai, both of Yamanashi, Japan

[73] Assignees: Pioneer Electronic Corporation, Tokyo; Pioneer Video Corporation, Yamanashi, both of Japan

[21] Appl. No.: 903,190

[22] Filed: Sep. 3, 1986

[30] Foreign Application Priority Data

Sep. 3, 1985 [JP] Japan ................................. 60-195041

[51] Int. Cl.$^4$ ............................................... H04N 5/85
[52] U.S. Cl. ................... 358/342; 360/14.2; 360/14.3; 360/20; 360/27
[58] Field of Search ............... 358/335, 337, 339, 342, 358/343, 341; 360/5, 14.1–14.3, 18, 19.1, 20, 22, 27, 30, 48, 51, 55, 49, 33.1, 13; 370/69.1, 16; 371/2; 375/34

[56] References Cited

U.S. PATENT DOCUMENTS

| | | | |
|---|---|---|---|
| 4,012,784 | 3/1977 | Murphy et al. | 360/22 X |
| 4,194,222 | 3/1980 | Ebbinga | 360/20 X |
| 4,222,072 | 9/1980 | Bailey et al. | 371/2 |
| 4,283,786 | 8/1981 | Okamura | 371/2 |
| 4,329,719 | 5/1982 | Ninomiya | 360/14.3 |
| 4,383,280 | 5/1983 | Copeland | 360/20 X |
| 4,470,142 | 9/1984 | Ive | 371/2 |
| 4,491,879 | 1/1985 | Fine | 360/14.1 |
| 4,496,993 | 1/1985 | Sugiyama et al. | 358/335 |
| 4,556,973 | 12/1985 | Uemura | 370/76 X |
| 4,598,324 | 7/1986 | Efron et al. | 358/342 X |

Primary Examiner—Raymond F. Cardillo
Assistant Examiner—W. R. Young
Attorney, Agent, or Firm—Sughrue, Mion, Zinn, Macpeak & Seas

[57] ABSTRACT

A video disk recording method and the recorded disk in which a video signal is frequency-multiplexed with a digital data signal into respective frames which are asynchronous to each other. A time code is recorded in both types of frames. The time is incremented periodically but the period in one of the types of frames is occasionally varied to compensate for the asynchronism.

5 Claims, 3 Drawing Sheets

PROCESS OF RECORDING TIME CODES ONTO A VIDEO DISK INCLUDING PERIODIC ADJUSTMENT OF TIME CODES

BACKGROUND OF THE INVENTION

1. Field of the Invention

The present invention relates to a video disk on which a video signal and a digital data signal are multiplex recorded.

2. Background Art

Recently, disks on which information is densely recorded have been developed and commercialized. Typical examples of such disks are video disks and digital audio disks. There are various systems for recording such disks. In the case of optical video disks, a carrier of 8.1 MHz for a television video signal is frequency-modulated so as to make a synchronization level and a white level of the video signal be 7.6 MHz and 9.3 MHz for recording of the television video signal. Also, a carrier of 2.3 MHz and 2.8 MHz for an audio signal accompanying the television video signal, which is used as a stereophonic signal, a bilingual signal, or the like, is frequency-modulated to thereby record the audio signal. In the case of optical digital audio disks, on the other hand, a spectrum of an EFM (Eight-to-Fourteen Modulation) signal of a pulse-code-modulated (PCM) stereophonic audio signal occupies a frequency band lower than about 2 MHz. Since such a frequency band below about 2 MHz is empty in a video disk, it is possible to record such an EFM signal as described above onto the video disk by frequency-divisionally multiplexing the EFM signal.

On such video and digital audio disks as described above, time codes such as AMIN, ASEC, AFRAME, (minute, second and frame) or the like, used as absolute addresses, are recorded for every television frame or for every subcode frame. In a video disk, for example, the frequency of the television frame is selected to be 29.97 Hz (in the case of the NTSC system), and therefore the time code is incremented by one second every 30 frames from the initiation of a program. The frame numbers from 0 to 29 are respectively added to the 30 television frames belonging to the same second. That is, for example, the 29th frame of the 10th second is followed by the sequence of the 0th frame of the 11th second, the 1st frame of the 11th second, the 2nd frame of the 11th second, and so on.

In a digital audio disk, on the contrary, the time code is recorded for every subcode frame (block) at a rate of 75 Hz. In this case, 75 subcode frames (75 blocks) correctly correspond to 1 second, and therefore the time code is incremented by one second for every 75 subcode frames. The frame numbers from 0 to 74 are respectively added to the 75 subcode frames belonging to the same second. That is, for example, the 74th frame of the 10th second is followed by the sequence of the 0th frame of the 11th second, the 1st frame of the 11th second, and so on.

The frequency of a subcode frame of such a digital data signal as described above is selected to be 75 Hz so that a time code of each subcode frame is coincident with actual time. That is, 1 second accurately elapses while the data signal of 75 subcode frames is reproduced. The frequency of a television frame of the video signal, on the other hand, is selected to be 29.97 Hz, and therefore a time code of each television frame is not exactly coincident with actual time. That is, an error of about 3.6 second is generated for one hour of actual playing time. Since the above-mentioned error is small, there has been no disadvantage in practical use when only the video signal is recorded on a video disk and retrieval is performed only by the time code of the video signal. However, when the digital data signal is successively and continuously recorded on the video disk by being superimposed on the video signal and the respective time codes of the digital data and video signals are recorded on the video disk, the retrieved position when the time code of the digital data signal is retrieved is different from that when the time code of the video signal is retrieved. As a result, the practical use of the video disk is degraded. The displacement in subcode frame reference time corresponds to about 270 subcode frames in 60 minutes of video frame reference time which is counted on the assumption that 30 television frames correspond to 1 second.

Recently, the inventor of this application has proposed a process in which the second timing of one of the respective time codes of a television frame and a subcode frame is incremented by one at a television frame or a subcode frame newly initiated only after the second timing of the other time code has been incremented by one (Japanese Patent Application No. 146985/85 and U.S. patent application, Ser. No. 882,002, filed July 3, 1986). In this proposal, however, there has been an inconvenience that it is necessary to use a signal synchronized with the television frame or the subcode frame in order to edit a digital data or a video signal to be recorded onto a video disk.

SUMMARY OF THE INVENTION

An object of the present invention is therefore to eliminate the foregoing disadvantages in the prior art.

In order to attain this object, according to an aspect of the present invention, a video disk is proposed on which are recorded both a digital data signal and a video signal. The digital data signal is composed of a set of subcode frames, an integral number of which exist in a predetermined time unit. The video signal is composed of a set of television frames frequency-multiplexed on the digital data signal but not synchronized with a repetition frequency of the subcode frames constituting the digital data signal. Additionally recorded on the video disk are a first and a second time code. The first time code is included in the digital data signal and is increased every time the number of times of generation of the subcode frame assumes a first predetermined value. The second time code is included in the video signal and is increased every time the number of times of generation of the television frame assumes a second predetermined value. The first and second predetermined values are increased or decreased every predetermined period so as to reduce cumulative errors generated between the first and second time codes. Thereby it becomes possible that the same position of time code can be retrieved in the units of minute or second using either the time code of the video signal or of the digital data signal.

The present invention will be apparent from the following detailed description taken in conjunction with the accompanying drawings.

DETAILED DESCRIPTION OF THE PREFERRED EMBODIMENT

Assuming that the frequency $f_c$ of a color subcarrier is 3.579545 MHz, the precise frequency $f_v$ of television frames in the NTSC system is obtained through the following expressions:

$$f_c = 455 f_H/2$$

$$f_H = 525 f_v$$

$$f_v = 29.9700 \text{ (Hz)}$$

where $f_H$ represents the frequency of a horizontal synchronizing signal. Accordingly, the displacement of the subcode frame reference time in two minutes of the video frame reference time becomes as follows:

$$2 \times 60 \times 75 \times (30 - 29.970026)/29.970026 = 0.0011933.$$

Accordingly, it is possible to cause the video frame reference time to coincide with the subcode frame reference time in the units of seconds by the addition of 9 subcode frames every two minutes.

The previously mentioned application of the inventor and its corresponding U.S. application are referenced for the structural details of the circuitry.

Figure 3:
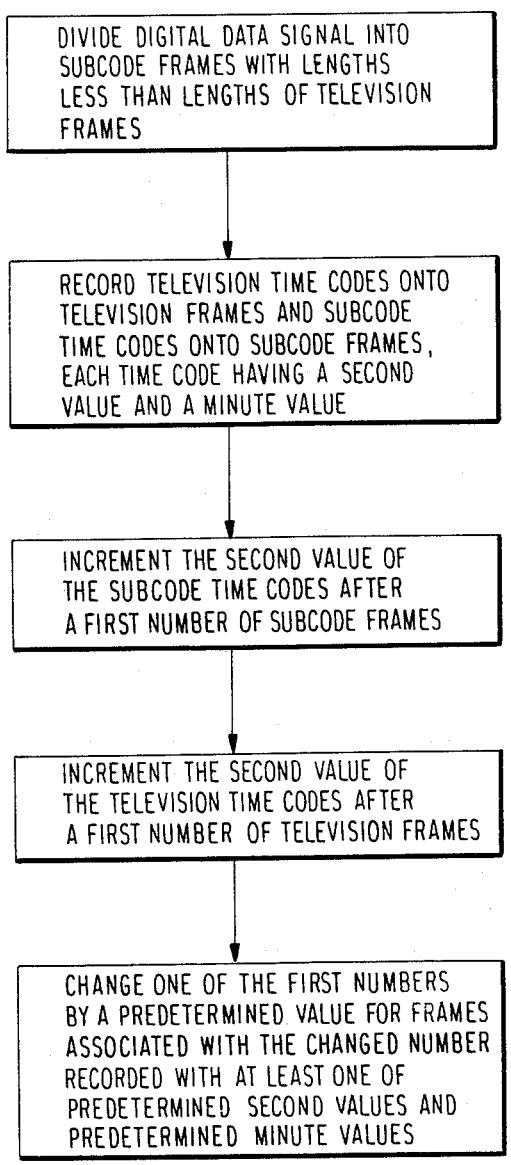
FIG. 3 is a flowchart illustrating main steps in the process of recording information on a video disk according to the present invention.

FIG. 3 is a flowchart illustrating main steps in the process of recording information on a video disk according to the present invention.

Figure 1:
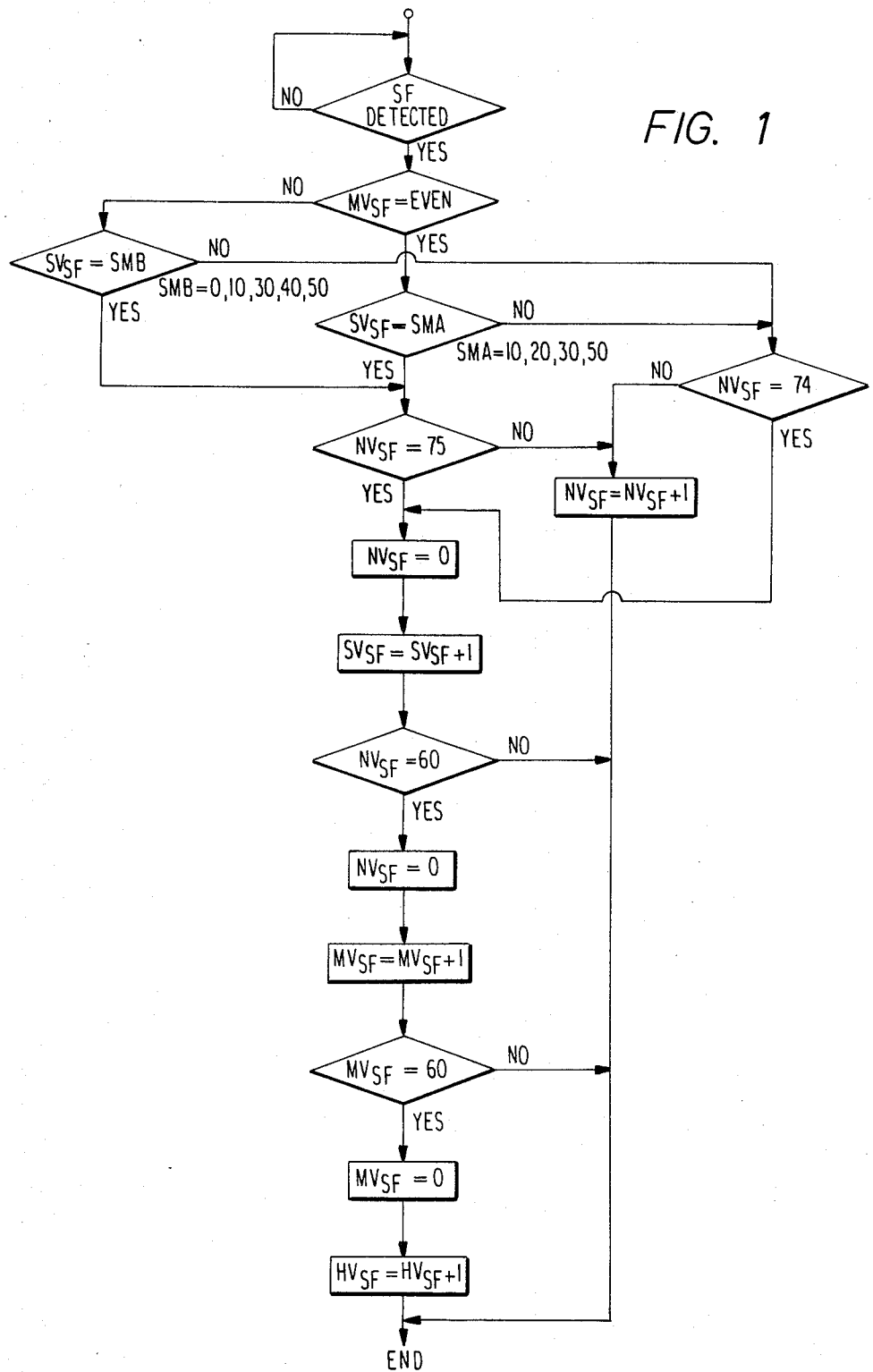
FIG. 1 is a flowchart illustrating the execution of the process of recording information on a video disk according to the present invention.

FIG. 1 is a flowchart which illustrates how the process of producing a time code of a subcode frame is carried out, according to the present invention as shown in FIG. 3. According to the present invention, for example, a subcode frame of a digital data signal to be recorded onto a video disk is detected, and the detection signal is counted by a counter to thereby produce a time code of the digital data signal corresponding to the counted value of the counter.

Next, description will be made as to the process of producing a time code according to the present invention.

Every time a subcode frame of a digital data signal to be recorded onto a video disk is detected, a test is made as to whether the numerical value of the minute value ($MV_{SF}$) of the time code at that time is an even number (0, 2, 4, ...) or not. If the test proves that the numerical value of the minute value of the time code at that time is an even number, a further test is made as to whether or not the numerical value of the second value ($SV_{SF}$) of the time code at that time is equal to a value SMA (10, 20, 30, or 50), that is, selected multiples of A seconds, where A = 10.

If the test proves that the numerical value of the second value of the time code at that time is equal to any one of 10, 20, 30 and 50, a further test is made as to whether the numerical value of the subcode frame (SF) is equal to 75 or not. If the test proves that the numerical value of the subcode frame is not equal to 75, the numerical value of the subcode frame is incremented by one, and the operation waits till the next subcode frame is detected. If the test proves that the numerical value of the subcode frame is equal to 75, on the other hand, the numerical value of the subcode frame is reset (set to zero) and the numerical value of the second value is incremented by one. At that time, a test is made as to whether the incremented value of second value is equal to 60 or not. If the test proves that the incremented value of second is not equal to 60, the operation is ended. If, on the other hand, the test is positive, the second value is reset (set to zero), and the minute value is increased by one. A further test is made as to whether the increased minute value ($MV_{SF}$) is equal to 60. If so, the operation is ended. But if the test is negative, the numerical minute value is reset (set to zero), and the numerical hour value ($HV_{SF}$) is incremented by one and the operation is ended.

If, on the other hand, the early test proves that the numerical second value ($SV_{SF}$) is not equal to one of the values SMA, (that is, not equal to any of 10, 20, 30, and 50), a test is made as to whether or not the numerical value of the subcode frame is not equal to 74. If the numerical value of the subcode frame is not equal to 74, it is incremented by one, and the operation is ended. If the numerical value of the subcode frame is equal to 74, on the other hand, the numerical value of the frame is reset, and subsequently the same processing as described above is repeated.

If the first test, however, proves that the numerical minute value is not an even number, that is, the minute value is an odd number, a test is made as to whether or not the numerical second value is equal to a value SMB (0, 10, 30, 40 or 50), that is, to other selected multiples of B seconds, where B also equals 10 seconds. If the test proves that the numerical second value is equal to any one of 0, 10, 30, 40, and 50, the test is made as to whether the numerical value of the subcode frame is equal to 75 or not. If the numerical second value is not equal to any of 0, 10, 30, 40, and 50, on the other hand, the test is made as to whether the numerical value of the subcode frame (SF) is equal to 74 or not. Subsequently, the same processing as described above is repeated.

That is, according to the present invention, when the numerical minute value ($MV_{SF}$) is an even number, the number of the subcode frames (SF) is incremented one-by-one to 75 in the case where the numerical second value ($SV_{SF}$) is equal to any one of 10, 20, 30, and 50, while the number of the subcode frames (SF) is incremented to 74 in the case where the numerical value of second ($SV_{SF}$) is not equal to any of 10, 20, 30, and 50. On the other hand, when the numerical minute value is an odd number, the number of the subcode frames is incremented to 75 in the case where the numerical second value is equal to any one of 10, 20, 30, and 50, while the number of the subcode frames incremented to 74 in the case where the numerical second value is not equal to any of 10, 20, 30, and 50.

Figure 2:
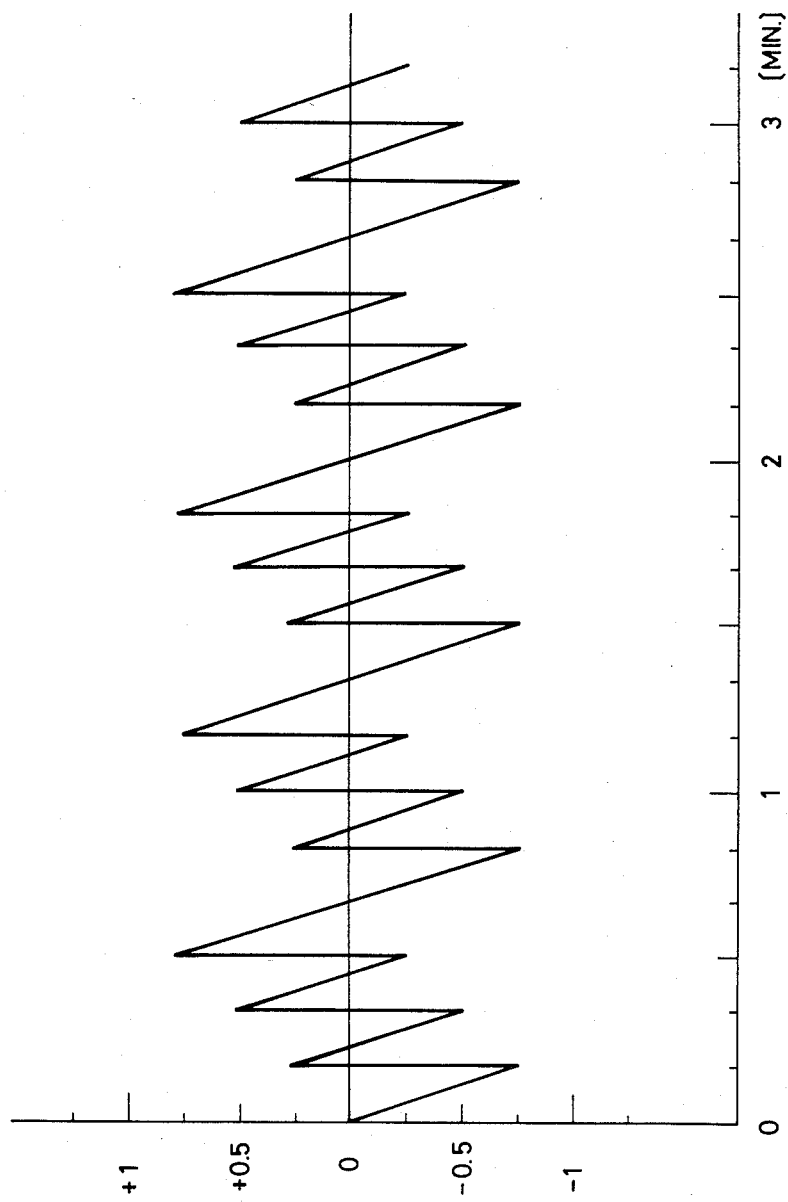
FIG. 2 is a diagram showing the characteristics of the same process according to the present invention.

In the case of the above described embodiment, the error of the subcode frame reference time relative to the video frame reference time is shown in FIG. 2. That is, the error is accommodated within a range of ±0.75 subcode frames (±0.3 video frames).

The precise timing of the additional frames is not crucial. Alternatively, for example, 1 (one) may be added to the number of the subcode frames every 10 seconds except at all 0 seconds and at 30 seconds in even minutes. In yet another alternative, 1 (one) may be added to the number of the subcode frames every 10 seconds except at all 0 seconds and at 30 seconds in odd minutes. In the former case, the error falls within a range from +0.75 to −1.25 subcode frames, while in the latter case, the error falls within a range of from +1.25 to −0.75 subcode frames.

In a still further alternative, 5 (five) may be added to the maximum number of the subcode frames at the initiation of the subcode frame at every minute except 0, 10, 20, 30, 40, and 50 minutes (that is, the number of the subcode frames at the first 1 second at every minute except the above listed minutes is made to be 80). In this case, the error falls within a range of ±4.5 subcode frames, and there is the advantage that the portion to be corrected is less because the correction is performed minute by minute.

Although the description has been made as to the case where the number of subcode frames is increased or decreased, the number of television frames, on the contrary, may be increased/decreased so as to make it possible to reduce a cumulative error in time code between both the subcode and television frames. In this case, it is possible to reduce the difference between the time code and the absolute time.

What is claimed is:

1. A method of recording onto a video disk in which a television video signal, including television frames, and a digital data signal are frequency-divided, and multiplex recorded onto the same track of said video disk, said method comprising the steps of:

dividing said digital data signal into subcode frames each having a length shorter than one of said television frames of said television video signal, said subcode frames being asynchronous with said television frames;

recording television time codes onto said television frames and subcode time codes onto said subcode frames, each of said time codes including a second value and a minute value;

incrementing said second value of said subcode time codes after a first number of subcode frames;

incrementing said second value of said television time codes after a first number of television frames;

changing one of said first number of subcode frames and said first number of television frames by a predetermined value for frames associated with said one changed number recorded with at least one of predetermined second values and predetermined minute values.

2. A method as recited in claim 1, wherein said changing step changes said one number by said predetermined value for frames associated with said one number recorded with predetermined second values and predetermined minute values.

3. A method as recited in claim 2, wherein said predetermined value is one.

4. A method as recited in claim 3, wherein said changing step changes said one number nine times for every two increments of said minute value of said frames associated with said one number.

5. A method as recited in claim 2, wherein said predetermined value is five.

* * * * *